(12) United States Patent
Lin (10) Patent No.: US 10,484,181 B2
(45) Date of Patent: Nov. 19, 2019

(54) STREAMING NON-REPUDIATION FOR DATA ACCESS AND DATA TRANSACTION

(71) Applicant: Datiphy Inc., San Jose, CA (US)

(72) Inventor: Yeejang James Lin, San Jose, CA (US)

(73) Assignee: Datiphy Inc., San Jose, CA (US)

( * ) Notice: Subject to any disclaimer, the term of this patent is extended or adjusted under 35 U.S.C. 154(b) by 179 days.

(21) Appl. No.: 15/375,383

(22) Filed: Dec. 12, 2016

(65) Prior Publication Data

US 2018/0167401 A1   Jun. 14, 2018

(51) Int. Cl.
*H04L 9/32* (2006.01)
*H04L 29/06* (2006.01)

(52) U.S. Cl.
CPC .......... *H04L 9/3247* (2013.01); *H04L 9/3239* (2013.01); *H04L 63/12* (2013.01); *H04L 2209/38* (2013.01)

(58) Field of Classification Search
CPC ... H04L 63/123; H04L 63/126; H04L 9/3236; H04L 9/3239; H04L 9/3242; H04L 9/32; H04L 9/3247; H04L 9/3249; H04L 9/3252; H04L 9/3255; H04L 9/3257
USPC .......................................................... 713/181
See application file for complete search history.

(56) References Cited

U.S. PATENT DOCUMENTS

| | | | | | |
|---|---|---|---|---|---|
| 5,754,659 | A * | 5/1998 | Sprunk | ................. | H04L 9/3242 380/30 |
| 6,105,012 | A * | 8/2000 | Chang | .................... | G06Q 20/00 380/277 |
| 6,170,744 | B1 * | 1/2001 | Lee | ....................... | G06Q 20/389 235/380 |
| 6,314,425 | B1 * | 11/2001 | Serbinis | .............. | G06F 17/3089 |
| 6,934,855 | B1 * | 8/2005 | Kipnis | ................. | G06Q 20/341 726/20 |
| 7,698,557 | B2 * | 4/2010 | Saarepera | ............. | H04L 9/3263 713/168 |
| 8,082,446 | B1 * | 12/2011 | Carroll | .................. | H04L 9/3247 713/176 |
| 8,750,562 | B1 * | 6/2014 | Ioffe | .................. | G06K 9/00744 382/100 |
| 9,390,289 | B2 * | 7/2016 | Mosko | ................ | G06F 16/2255 |
| 2001/0037453 | A1 * | 11/2001 | Mitty | ...................... | H04L 51/30 713/168 |
| 2002/0029337 | A1 * | 3/2002 | Sudia | .................... | G06Q 20/401 713/176 |
| 2002/0065912 | A1 * | 5/2002 | Catchpole | ......... | G06F 17/30873 709/224 |

(Continued)

OTHER PUBLICATIONS

Jianying Zhou et al., A Fair Non-repudiation Protocol, 1996 IEEE (Year: 1996).*

(Continued)

*Primary Examiner* — Kambiz Zand
*Assistant Examiner* — Mahabub S Ahmed
(74) *Attorney, Agent, or Firm* — Wang Law Firm, Inc.

(57) ABSTRACT

A system and method that generate digests for data transactions provide non-repudiation of collected data. Meta data based on the Data DNA modeling are collected for all data transactions in a system. The digest of the data transactions is encrypted. A digest is also generated for user sessions and time periods. The digests are recorded as part of Data DNA records and can be used for validation of data transactions in the system.

10 Claims, 7 Drawing Sheets

(56) References Cited

U.S. PATENT DOCUMENTS

| | | | |
|---|---|---|---|
| 2002/0138735 A1* | 9/2002 | Felt | G06Q 20/3829 713/176 |
| 2002/0184498 A1* | 12/2002 | Qi | H04L 9/0643 713/168 |
| 2002/0184504 A1* | 12/2002 | Hughes | H04L 9/3236 713/177 |
| 2003/0074395 A1* | 4/2003 | Eshghi | H04L 29/06 709/203 |
| 2003/0163691 A1* | 8/2003 | Johnson | H04L 29/06 713/168 |
| 2003/0163704 A1* | 8/2003 | Dick | H04L 63/0428 713/178 |
| 2003/0169745 A1* | 9/2003 | Gooch | H04L 45/00 370/395.32 |
| 2004/0030894 A1* | 2/2004 | Labrou | G06Q 20/02 713/168 |
| 2004/0078567 A1* | 4/2004 | Newbould | H04L 9/3247 713/161 |
| 2005/0005098 A1* | 1/2005 | Michaelis | G06F 21/121 713/156 |
| 2005/0065799 A1* | 3/2005 | Dare | G06F 21/6245 705/50 |
| 2005/0160272 A1* | 7/2005 | Teppler | H04L 9/12 713/178 |
| 2006/0005031 A1* | 1/2006 | Apostolopoulos | H04L 9/0637 713/179 |
| 2006/0080536 A1* | 4/2006 | Teppler | H04L 9/12 713/176 |
| 2007/0050626 A1* | 3/2007 | Tokie | G06F 21/645 713/176 |
| 2007/0288254 A1* | 12/2007 | Eisner | G06Q 10/0637 705/1 |
| 2007/0294205 A1* | 12/2007 | Xu | G06F 17/3033 |
| 2008/0122624 A1* | 5/2008 | Balinsky | G06K 7/0008 340/572.1 |
| 2008/0161114 A1* | 7/2008 | Wang | H04L 63/0428 463/42 |
| 2008/0228691 A1* | 9/2008 | Shavit | G06F 16/9014 |
| 2008/0307109 A1* | 12/2008 | Galloway | H04L 67/06 709/232 |
| 2009/0043652 A1* | 2/2009 | Ginter | G06F 21/10 705/14.69 |
| 2009/0044018 A1* | 2/2009 | Kirchner | G06F 21/64 713/176 |
| 2009/0063854 A1* | 3/2009 | Parkinson | H04L 63/20 713/158 |
| 2009/0083372 A1* | 3/2009 | Teppler | H04L 9/3226 709/203 |
| 2009/0164377 A1* | 6/2009 | Aissi | G06F 21/60 705/50 |
| 2009/0319779 A1* | 12/2009 | Thoursie | H04L 63/0442 713/156 |
| 2009/0319797 A1* | 12/2009 | Tornqvist | G06F 21/42 713/176 |
| 2010/0198705 A1* | 8/2010 | Spalink | G06F 21/6254 705/26.1 |
| 2010/0199094 A1* | 8/2010 | Ho | H04L 9/0844 713/171 |
| 2010/0232434 A1* | 9/2010 | Xu | H04L 45/00 370/392 |
| 2011/0264687 A1* | 10/2011 | Surtani | G06F 16/9014 707/769 |
| 2012/0084268 A1* | 4/2012 | Vijayan | G06F 3/0608 707/692 |
| 2012/0158729 A1* | 6/2012 | Mital | G06F 15/167 707/738 |
| 2012/0227094 A1* | 9/2012 | Begen | G06F 21/41 726/4 |
| 2013/0268679 A1* | 10/2013 | Asano | G06F 21/10 709/226 |
| 2013/0290285 A1* | 10/2013 | Gopal | G06F 16/215 707/698 |
| 2014/0019764 A1* | 1/2014 | Gopal | H04L 9/3247 713/176 |
| 2014/0250298 A1* | 9/2014 | Thoursie | H04L 63/0442 713/157 |
| 2014/0258524 A1* | 9/2014 | Thyni | H04L 43/0852 709/224 |
| 2015/0256461 A1* | 9/2015 | Mosko | H04L 45/7453 370/392 |
| 2016/0283920 A1* | 9/2016 | Fisher | G06Q 20/065 |
| 2016/0344550 A1* | 11/2016 | Anton | H04L 9/3236 |
| 2017/0141924 A1* | 5/2017 | Ryu | H04L 9/3236 |
| 2019/0103975 A1* | 4/2019 | Jacobs | G06F 21/64 |

OTHER PUBLICATIONS

Jianying Zhou et al., An Efficient Non-repudiation Protocol, 1997 IEEE (Year: 1997).*

Yu Lei et al., Generating Digital Signatures on Mobile Devices, Proceedings of the 18th International Conference on Advanced Information Networking and Application, 2004 IEEE (Year: 2004).*

Sumit Goswami et al., A PKI based Timestamped Secure Signing Tool for eDocuments, 2014 IEEE (Year: 2014).*

Chen Tianhuang et al, Digital Signature In The Application of E-Commerce Security, 2010 International Conference on E-Health Networking, Digital Ecosystems and Technologies (Year: 2010).*

Harigopal K.B. Ponnapalli et al., A Digital Signature Architecture for Web Apps, IT Pro Mar./Apr. 2013 (Year: 2013).*

Junling Zhang, A Study on Application of Digital Signature Technology, 2010 International Conference on Networking and Digital Society (Year: 2010).*

Likun Zhu et al., Electronic Signature Based on Digital Signature and Digital Watermarking, 2012 5th International Congress on Image and Signal Processing (CISP 2012) (Year: 2012).*

* cited by examiner

STREAMING NON-REPUDIATION FOR DATA ACCESS AND DATA TRANSACTION

BACKGROUND OF THE INVENTION

1. Field of the Invention

The present invention generally relates to data security, and more specifically, relates to a system and method for data non-repudiation.

2. Description of the Related Art

Information is becoming most valuable asset for any company in today's business world and consequently the need to protect the information is of paramount importance for every company. However, the effectiveness of the data protection cannot be easily measured and the integrity of the data cannot easily be verified because the data are usually in transit, moving from one point within a system to another point. Most of data verification systems can only verify the integrity of a static data file and cannot voucher whether a stream of data activity records has been tempered or not.

Therefore, there is a need for a system and method that verifies the integrity of any stream of data activity records and also the data transactions applied to the data activity records, and it is to this system the present invention is primarily directed to.

SUMMARY OF THE INVENTION

The system of the present invention provides a system and methods for providing data non-repudiation through verification of data transactions. In one embodiment, the present invention provides a method for providing data non-repudiation. The method comprises capturing data, into a captured data, from a data transaction, hashing the captured data into a hashed data, encrypting the hashed data into a digest, and appending the digest to the captured data to form a data transaction digest, wherein the data transaction digest provides non-repudiation for the captured data.

In another embodiment, there is provided a system for providing data non-repudiation. The system comprises a monitoring unit connected to a network, a network interface unit in communication with the monitoring unit, the network interface monitors data transactions on the network, a non-volatile computer-readable memory unit for storing computer program instructions, and a control unit, wherein the control unit, when executing computer program instructions, causes the system to capture data, into a captured data, from a data transaction, hash the captured data into a hashed data, encrypt the hashed data into a digest, and append the digest to the captured data to form a data transaction digest, wherein the data transaction digest provides non-repudiation for the captured data.

The present system and methods are therefore advantageous as they enable data non-repudiation for data transactions. Other advantages and features of the present invention will become apparent after review of the hereinafter set forth Brief Description of the Drawings, Detailed Description of the Invention, and the Claims.

BRIEF DESCRIPTION OF THE DRAWINGS

Features and advantages of embodiments of the invention will become apparent as the following detailed description proceeds, and upon reference to the drawings, where like numerals depict like elements, and in which.

DETAIL DESCRIPTION OF THE INVENTION

In this description, the term "application" as used herein is intended to encompass executable and non-executable software files, raw data, aggregated data, patches, and other code segments. The term "exemplary" is meant only as an example, and does not indicate any preference for the embodiment or elements described. Further, like numerals refer to like elements throughout the several views, and the articles "a" and "the" includes plural references, unless otherwise specified in the description. The terms "system" and "network" are used interchangeably and the terms "data" and "information" are also used interchangeably unless otherwise stated. The terms "user data session" and "data session" are used interchangeably.

Figure 1:
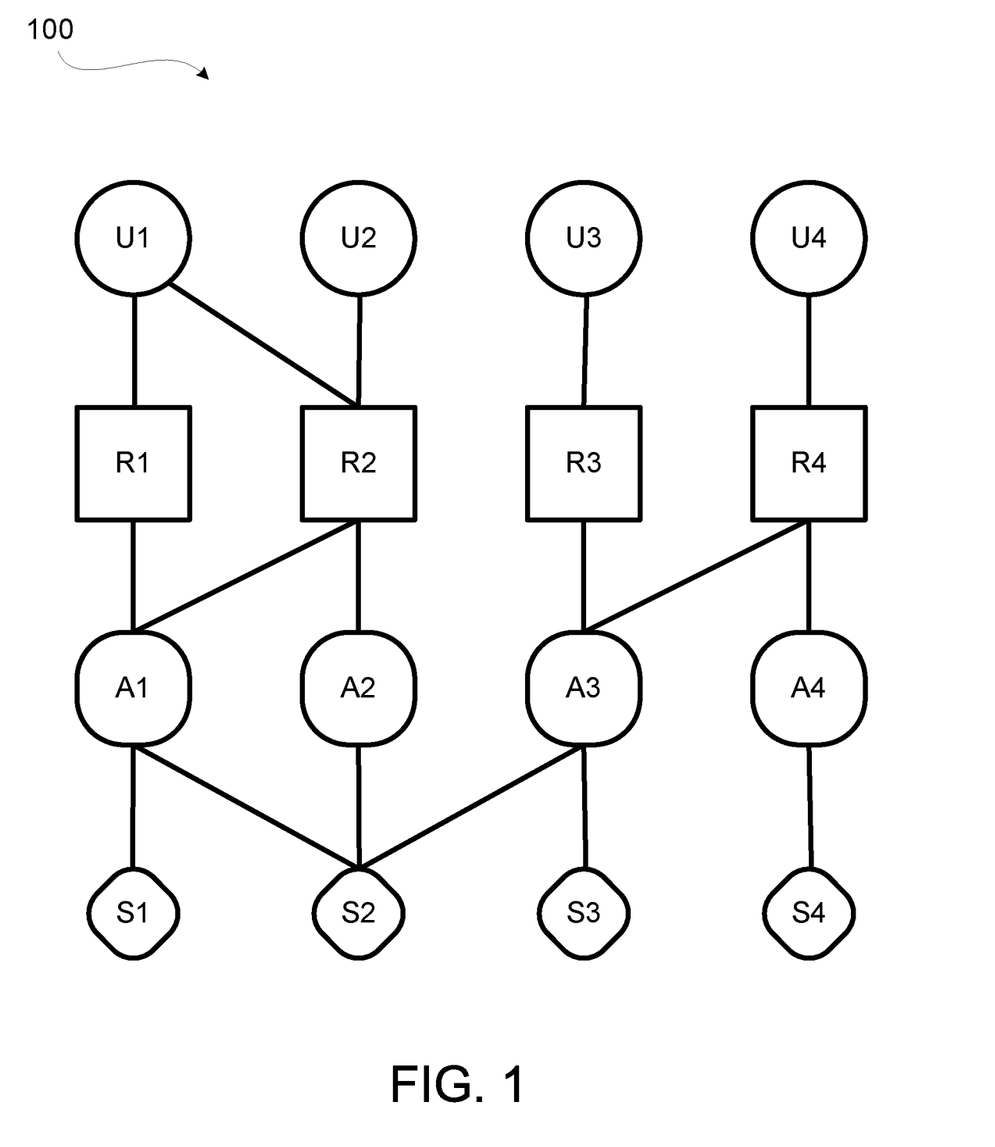
FIG. 1 is an illustration 100 of different elements involved in data transactions in a system.

In an overview, the present invention provides a system and method for providing data non-repudiation through verification of data transactions. The non-repudiation verifies the data integrity. FIG. 1 is a simple illustration 100 of different elements involved in data transactions in a system. Multiple users $U_n$ may access information stored in one or more servers $S_n$. A user U1 may request data stored on a server S1 through an action A1 that follows a rule (policy) R1; the user U1 may also use the same command (action) A1, following the same rule R1, to access another data stored on another server S2. Similarly, user U2 may request a piece of information stored on the server S2 through a command A2 that follows a rule R2. The same information request from the user U2 can also be made by invoking the command A1 using the rule R2.

The above description reflects a common scenario in today's business world, where an employee Adam can access a design data X stored on a server S1 while working on his computer in his office and also can continue to work, using the same design data X, from his home computer. The design data X may also be accessed by another employee Bob who uses his laptop computer to access the design data X while on a business trip.

To easily track and understand the data collected by the tracking and monitoring system, the present invention uses the concept of data DNA. The concept of data DNA is introduced by U.S. patent application Ser. No. 14/990,399 filed on Jan. 7, 2016, the specification of which is incorporated herein by this reference. The data DNA is a set of data representing a data model based on the concept of molecule formed by atoms and bonds and this data mode enables users to easily describe data access, data transactions, and data activities. The data DNA model also enables users to discover and manage data elements (atoms) and interactions (bonds) between them during a data access. The methods based on this data DNA model enable auditing, regulating data access and access behaviors. These access behaviors can be changed by rules and actions from the users. By using the methods of the present invention, business needs for data audit, data security, data forensics, data asset management, and data analytics can be easily accomplished.

The data DNA model is useful to describe data, data assets, data activities, data policies, data transactions, data events, data risks, and data life cycle. Under this data DNA model, several related models can be derived, such as asset DNA, event DNA, rule DNA, etc. The asset DNA may be used to describe data asset, data asset group, or data asset type, in terms of atoms and bonds. The event DNA may be used to describe data activity or collection of data activities also in terms of atoms and bonds.

In the data DNA model, atom is a basic building block and may refer to assets, rules, and actions. Assets may include servers, clients, users, databases, tables, columns, data signatures, conditions, errors, etc. Rules are generally defined and/or configured by users. Actions are also defined and/or configured by users. Another basic building block is bond and bond refers to the relationships between atoms, such as the relationship between a database (DB) user and a server, a database, a client program, a data signature, rules, actions, and so on. Bond may be used to detect "vibrations" in the data model and this reflects to deviations in data behavior.

Under the data DNA model, a clear and concise understanding of data can be achieved easily and data can also be easily managed. In the data DNA model, assets are the building blocks to form an access and the asset may include:

Servers, Clients
App User, DB Users, Programs, OS Accounts, Client Hosts, Language, Charset
Method—Commands and Command Statement
Read, write, select, insert, update, exec, etc.
Objects—Data Containers, DB, Tables, Columns, Conditions
Contents—signatures, patterns
Results—outputs and Errors
Policies—defined by users
Actions—defined by users
Groups—defined by users The data DNA model is particular useful to track data elements involved in a data transaction and the data DNA model can also be used to represent the dynamic nature of data transactions by capturing the information on the assets involved in the data transactions.

The data DNA model described is useful to track and capture the dynamic data transactions illustrated in FIG. 1, where the data is accessed by different users through different means at different times, and the integrity of the data is difficult to verify because of the dynamic nature of data transactions that affect the data. By employing the data DNA model, the integrity of a data file captured from data transactions can be verified.

The present invention introduces methods that captures streams of data transactions in real time and makes a digest for the captured data transactions through encoding. The digest is a digital signature of the capture data transactions and reflects the integrity of the data transactions. The digest is recorded as meta data in a data file. The digest is commonly derived from hashing of the captured data followed by an encryption.

The digest can be made for streaming data from any individual data transaction, data transactions from a user data session or any part of a user data session, or data transactions over any period of time. The resulting streaming digest can be used to validate the integrity of the streaming data. The non-repudiation of the data in a system can be achieved through streaming digests for data transactions, streaming digest for user data sessions, or streaming digest for any period of time.

Figure 2:
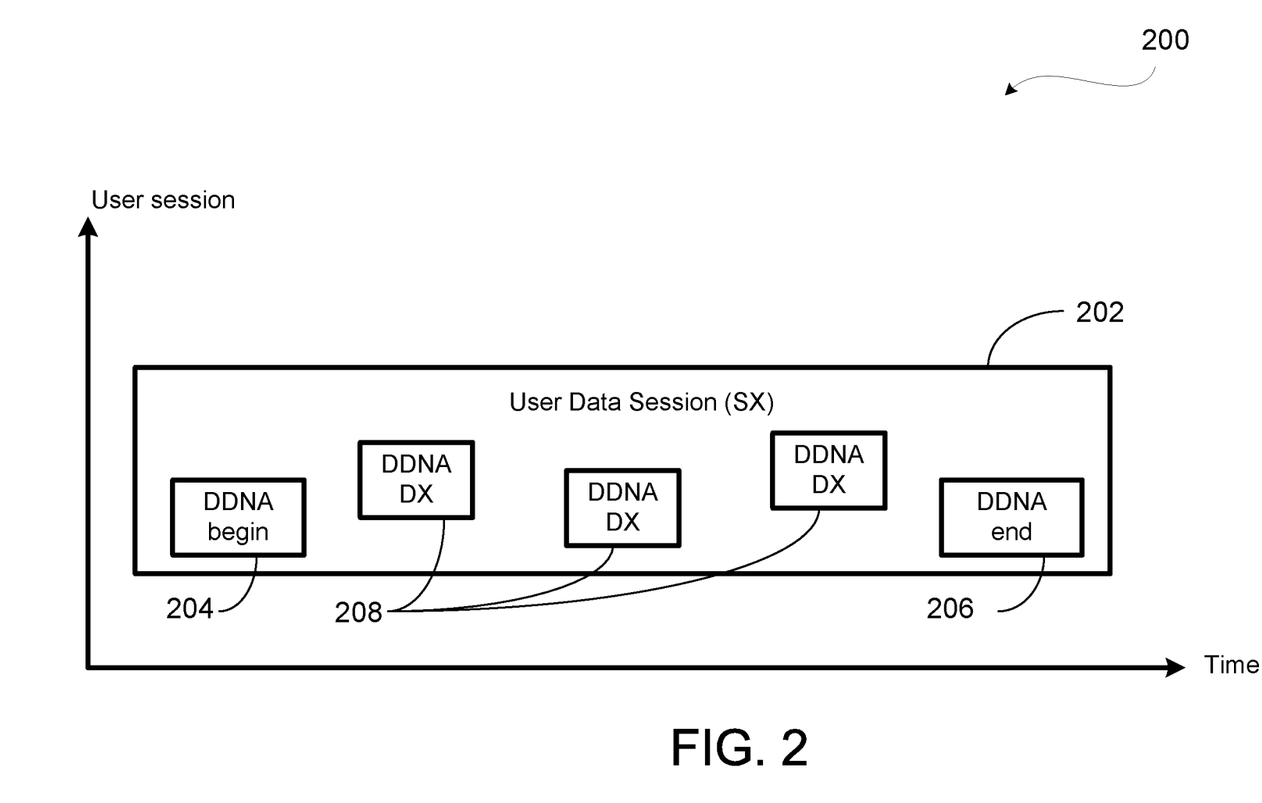
FIG. 2 is an illustration 200 of data transactions in a user data session.

FIG. 2 is an illustration 200 of data transactions in a user data session 202. A user data session starts when a user logs into a system and a timer starts. The user data session may end when the user logs off from the system or when the timer expires. In a user data session there may be one data transaction or several data transactions 208, the data for each data transaction (DX) is captured in form of a Data DNA (DDNA). Each user data session (SX) is marked with a beginning data transaction (DDNA) 204 and ends with an ending data transaction (DDNA) 206. Each data transaction 204, 206, 208 has a digest, which includes parsed information of the query and the response along with some tagged information related to the data transaction, such as alert and rules.

As described above, a data transaction includes a data query and a corresponding data response, each of which is captured in a data record and stored in a data file. The Data Transaction Digest (DXD) for the data transaction is generated according to the following formula:

$DXD_n = F(Q_n, R_n, T_n);$ (Equation 1)
wherein $DXD_n$ is the digest of the data transaction n;
$Q_n$ is the query n;
$R_n$ is the response n; and
$T_n$ represents tagged information for the data transaction n.

The DXD is computed and appended to DDNA DX as it is created for each data transaction. The DXD is generated by hashing the data from the query and the response followed by an encryption. The tagged information related to the data transaction is attached after the encryption. The DXD is used to verify the integrity of a particular data transaction and the meta data created is stored as part of the DDNA for the data transaction (DDNA DX).

The same concept of integrity protection can be applied to all the data transactions within a user data session (SX). The integrity of each data transaction within a user data session is individually verified by a DXD and the integrity of the data transactions within a user data session can be verified by generating a user data session digest (SXD) for each DX.

The SXD is generated according to the following formula.

$SXD_n = F(DXD_n, SXD_{n-1});$ (Equation 2)
Wherein $SXD_n$ is the digest of the user data session for the data transaction n;
$DXD_n$ is the digest of the data transaction n;
$SXD_{n-1}$ is the digest of the user data session for the data transaction n-1.

There is a predefined $SXD_0$ value for each user session, for example:

$SXD_0 = F(\text{Session ID}, DXD_0);$
Wherein Session ID is an unique identifier ("SSID" in the DX DDNA example) for a user session; and
all DX DDNA within the same session labeled with the same session ID.

The $SXD_n$ is generated dynamically as the data transactions are recorded and the $SXD_n$ is recorded as meta data in a data file. The SXD is generated by hashing the data from the DXD and $SXD_{n-1}$ followed by an encryption. As it can be seen from Equation 2, there is a user data session digest (SXD) for each data transaction within a user data session and one $SXD_n$ depends on a previous $SXD_{n-1}$. This sequential relationship allows the integrity of all the data transactions within a user data session to be verified. If the record of one data transaction within a user data session is deleted or removed for any reason, the deletion of one data transaction will not affect the integrity of the remaining data transactions. However, the missing data transaction will be readily detected because the relationship between two adjacent $SXD_n$ an $SXD_{n-1}$ will no longer match.

Figure 3:
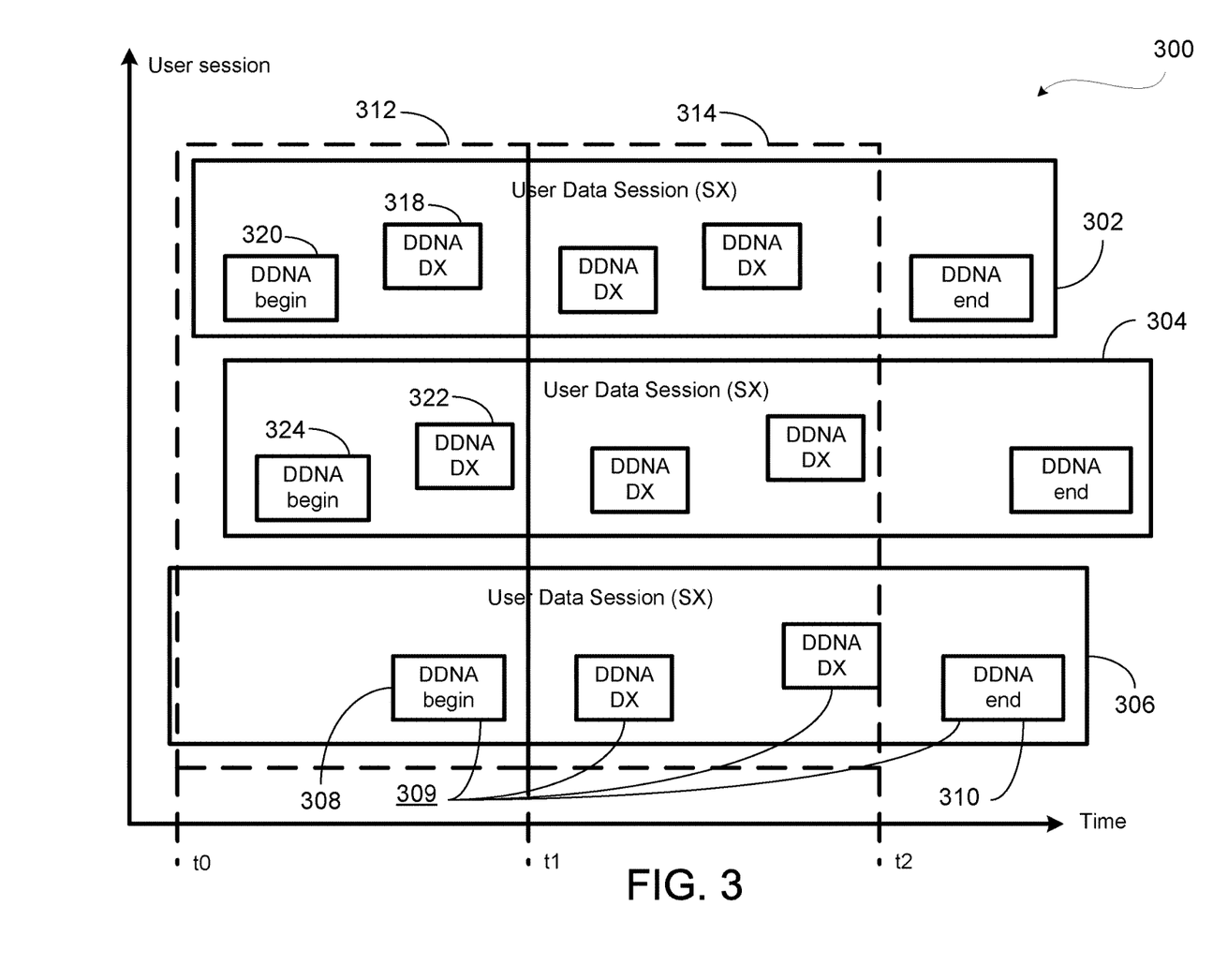
FIG. 3 depicts multiple user data sessions.

The methods of the present invention can also be further extended to provide verification for all the data transactions in a multi-user system. FIG. 3 depicts multiple user data sessions 302, 304, 306, each user data session having multiple data transactions 309. Each user data session 306 is started by one user. Similarly, each user data session has a beginning that starts with a data transaction 308, which data is captured in form of Data DNA (DDNA) and the user data session ends with an ending data transaction 310. The user data sessions (SX) may start at different time and also may end at different time. To ensure non-repudiation of the data collected in this system, the data transactions can be grouped according to the time when the data transaction occurs. For example, for DDNA DX 318, DDNA DX 320, DDNA DX 322, DDNA DX 324, and DDNA DX 308 occurred during time period 312 and their DXs are used to generate a time period digest (TXD) and this TXD can be used to verify the integrity of the data transactions DDNA DX 318, DDNA DX 320, DDNA DX 322, DDNA DX 324, and DDNA DX 308 that occurred between time t0 and t1. The non-repudiation of the data collected for these data transactions is provided by this TXD. There is no direct relationship between two sequential TXDs, however, there is an indirect relationship between the TXDs through chaining of DXDs and SXDs.

The TXD is generated according to the following formula.

$TXD_n = F((DXD_i, \ldots, DXDj), (SXD_i, \ldots, SXDj))$ (Equation 3)
Wherein $TXD_n$ is the digest of all the $DXD_i$ and all the $SXD_i$ within a time period;
$DXD_i$ is the digest of a data transaction i;
$SXD_i$ is the digest of a user session transaction i;

The $TXD_n$ is generated dynamically as the data transactions are recorded and the $TXD_n$ is recorded as meta data in a data file. The TXD is generated by hashing the data from all DXD and SXD within the time period and followed by an encryption. If the record of any data transaction is deleted, modified, or otherwise removed for any reason, the TXD for that particular time period will no longer match the newly calculated TXD. However, the missing data transaction will be readily detected because the relationship between two adjacent $SXD_n$ an $SXD_{n-1}$ will no longer match. DXD and SXD are part of a data transaction record and if the data transaction record is modified or deleted, the corresponding DXD will be no longer available. If the content of a data transaction record is deleted or modified but the DXD and SXD still remain, the DXD and SXD will no longer match.

The digest introduced by the present invention can be interpreted as a data signature of a block of data. The digest is generally calculated by first hashing a block of data and the resulting hash number is then encrypted to create a unique signature for the block of data. The Equation 1 can be further represented in the following manner.

$DXD_n = F(Signature(Hash(Q_n, R_n, T_n));$ (Equation 1.1)
wherein $DXD_n$ is the digest of the data transaction n;
$Q_n$ is the query n;
$R_n$ is the response n;
$T_n$ represents tagged information for the data transaction n;
Hash is a data hash function; and
Signature is an encryption function.

The tagged information $(T_n)$ is added to DX DDNA and this tagged information includes risks, matched rule, matched signatures, behaviors, actions to take, and etc. All DX DDNA includes tagged information $(T_n)$ and DXD is appended to DX DDNA and as part of DX DDNA.

Similarly, the SXD can be further represented according to the following formula.

$SXD_n = F(Signature(Hash(DXD_n, SXD_{n-1})));$ (Equation 2.1)
Wherein $SXD_n$ is the digest of the user data session for the data transaction n;
$DXD_n$ is the digest of the data transaction n;
$SXD_{n-1}$ is the digest of the user data session for the data transaction n-1;
Hash is a data hash function; and
Signature is an encryption function.

The TXD can also be further represented according to the following formula.

$TXD_n = F(Signature(Hash((DXD_i, \ldots, DXDj),$ (Equation 3.1)
$(SXD_i, \ldots, SXDj))))$
Wherein $TXD_n$ is the digest of all the $DXD_i$ and all the $SXD_i$ within a time period;
$DXD_i$ is the digest of a data transaction i;
$SXD_i$ is the digest of a data transaction i;
Hash is a data hash function; and
Signature is an encryption function.

Figure 4:
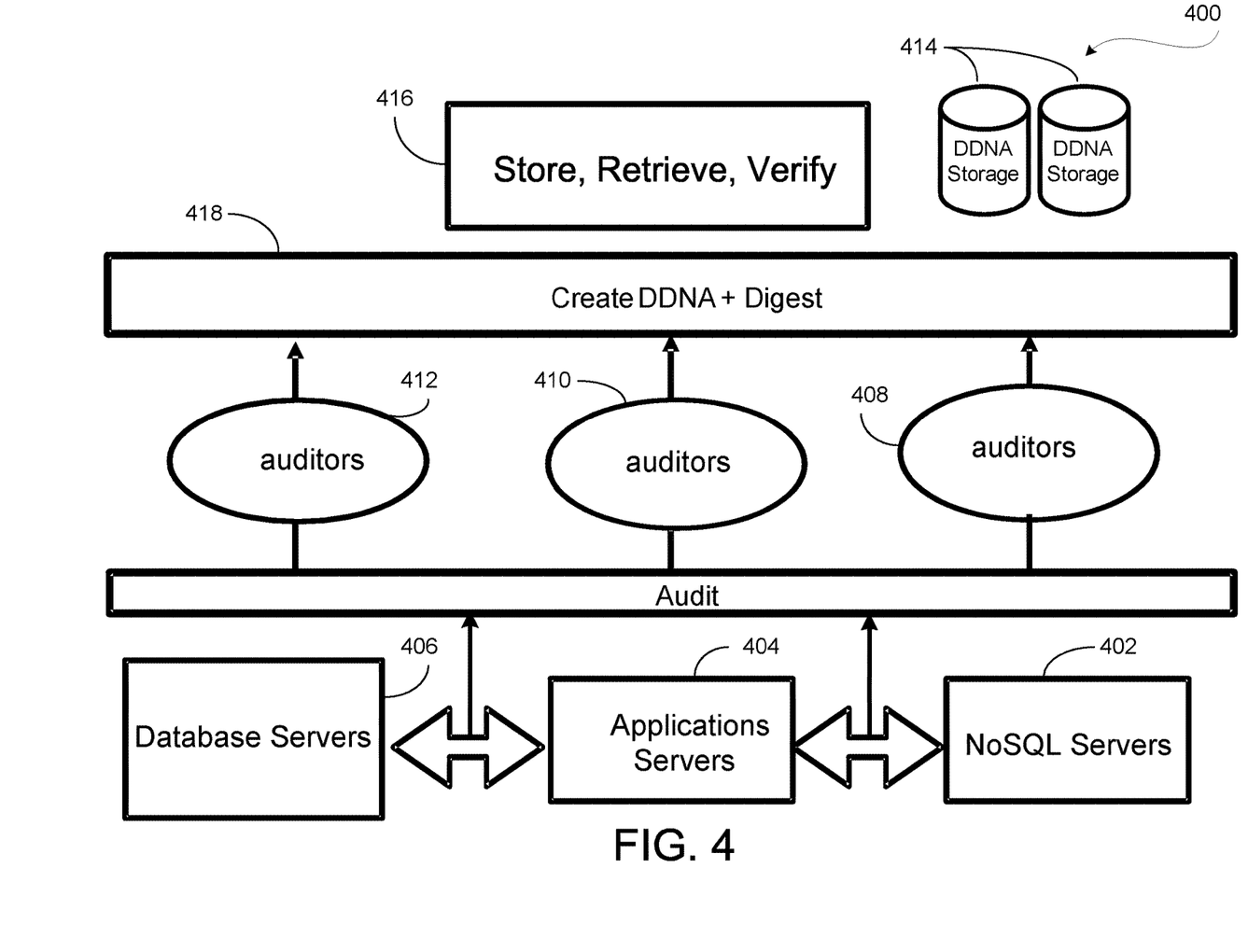
FIG. 4 illustrates architecture 400 of a system of the present invention.

FIG. 4 illustrates architecture 400 of a system according to the present invention. The system may be any system that supports data access from users using different applications. The applications invoked by the users may cause the data to transit between any two points in the system, for example, a data traveling from a user access point to a server inside the system or vice-versa. The traffic of data within the system can be observed by monitoring applications placed at the different points within the system. The monitoring applications capture data from the data traffic in the system. The integrity of these captured data can be verified using the streaming digest described above. The data transiting in the system may be a command from an application server 404 to a SQL server 402 or a request to a database server 406, may also be a response from the SQL server 402 or retrieved information from the database server 404. These data are captured by auditors 408, 410, 412, placed at different points in the system, and stored in form of Data DNA and the integrity of these resulting Data DNA can be ensured using the streaming digest technique described by the present specification. A digest (DXD) is generated 418 for each Data DNA (DDNA) and the DDNA and DXD are usually appended to the DDNA and stored in a data file 414. The stored DDNA and DXD can be searched, retrieved, and verified 416.

Figure 5:
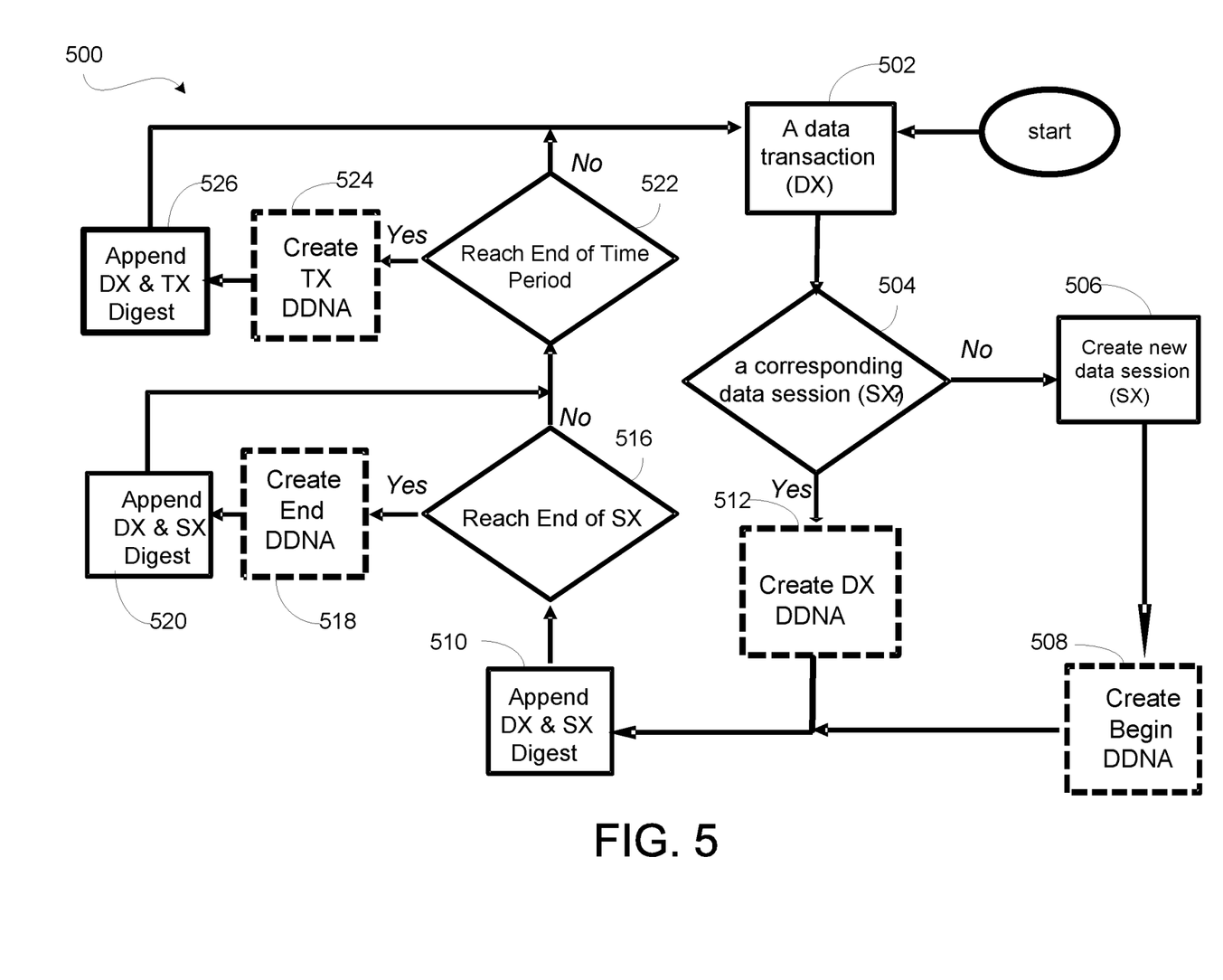
FIG. 5 is a flow chart 500 of a process of the present invention.

FIG. 5 is a flow chart 500 of a process for providing non-repudiation of the data within a system according to the present invention. The process starts when a data transaction, step 502, is detected. The data transaction can be a query to or a response from a database. The system checks whether there is a data session open for the user, step 504. If there is no data session opened, a new data session is created for the user, step 506, and the data from this data transaction (DX) is captured and stored in the form of a Data DNA (DDNA) and labeled as starting or beginning DDNA, step 508. A DDNA is marked as Begin DDNA if it is the first DDNA after a connection is started. Similarly, a DDNA is marks as End DDNA if the DDNA is the last when the connection ends. The data stored in the DDNA is hashed and encrypted to generate a digest (DXD) and the DXD is further used to generate another session based digest (SXD). The DXD and SXD for this particular data transaction are appended to the DX, step 510. If there is a data session opened for the user, the data from the data transaction (DX) is captured and stored in the form of a Data DNA (DDNA), step 512, and the resulting DXD and the SXD for this DX are also appended to the DX, step 510.

After the DXD and SXD are appended to the corresponding DX, the system checks whether the end of the data session has reached, step 516. Each data session is usually matched to a timer. The timer starts when the data session begins and the data session ends when the timer expires. If the data session has ended, an ending DDNA is created, step 518, and the digests, DXD and SXD, for the ending DDNA are generated and attached to the ending DDNA, step 520. A data session ends when the connection ends, resets, or times out. The ending DDNA carries a summary of all DX DDNAs of the entire user session. The content of the summary may be cross-checked against the info of DX DDNAs of the same sessions, and this cross-checking adds one more layer of assurance and non-repudiation on top of digital signature of DXD, SXD, and TXD. The End DDNA is a DX DDNA by itself, not adding info to prior DX DDNAs.

If the end of the data has not reached, the system checks whether the end of a time period has occurred, step 522. The system separates data transactions according to the time when the data transactions occurred. The data for the data transactions are marked with a time stamp and each time stamp has a time period identification. The time period identification does not reflect the actual time. The time period identification is a sequential marker that marks the sequential position of each time period.

If the end of the time period has not occurred, the process 500 repeats itself. If the end of the time period has occurred, the system creates a digest TXD for all the DXDs within the time period, step 524 and appends this TXD to each DX within the time period, step 526.

Figure 6:
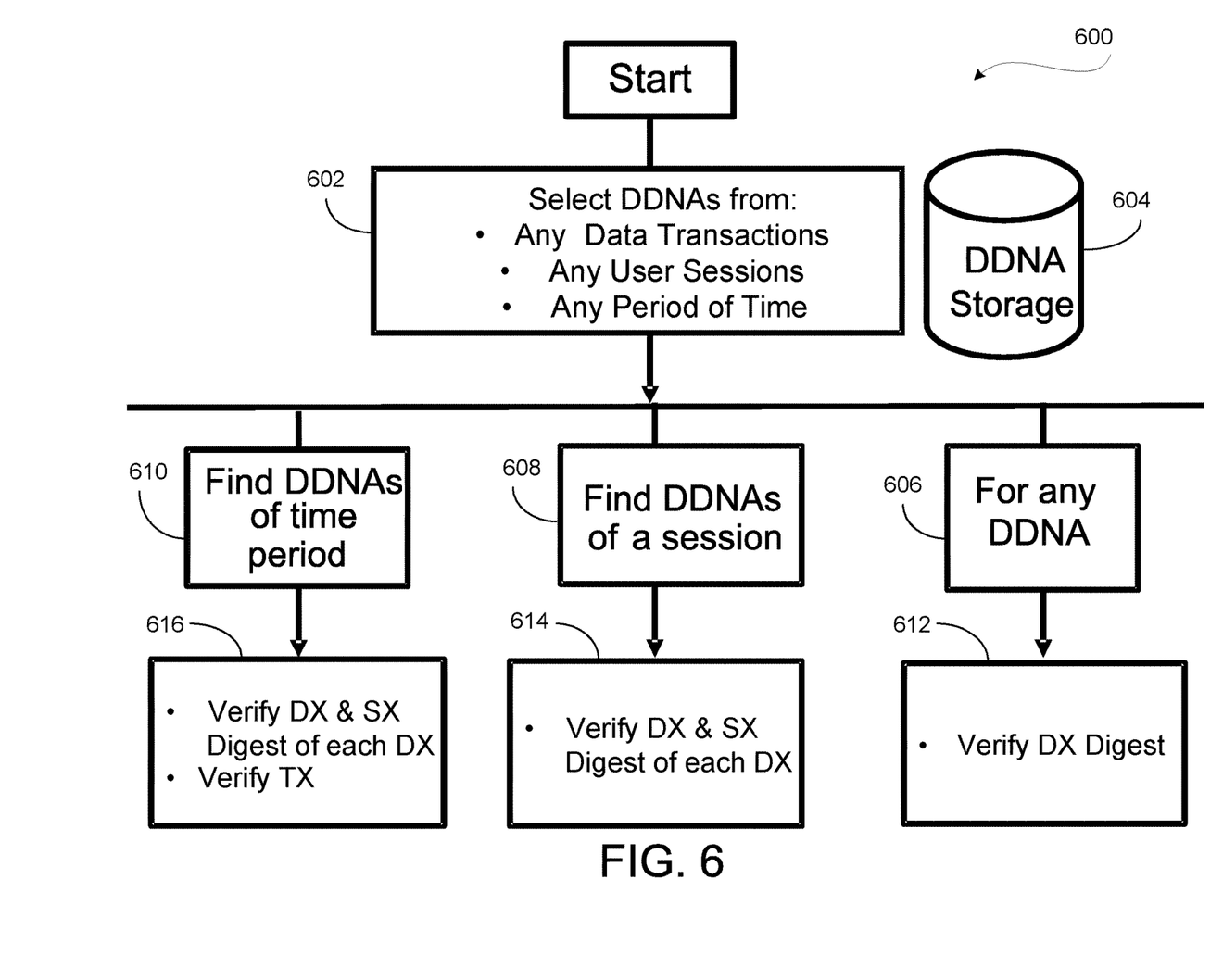
FIG. 6 illustrates process 600 for verification of non-repudiation of the data stored in the system.

The integrity of the data stored in the system can be easily verified using the digests calculated according to the present invention. FIG. 6 illustrates process 600 for verification of non-repudiation of the data stored in the system. A user can choose to verify data stored in the system, step 602. The user can verify the non-repudiation of data related for a particular data transaction, data from any user session, or data from any time period. If the user wants to verify the non-repudiation of data, step 606, the data can be verified by generating the digest for the data from the data transaction and compared the generated digest with the digest for the data transaction that was previously stored in the format DDNA, step 612. The user can also verify the non-repudiation of data from a user data session, step 608, by generating the digest for the data from data transactions (DXD) and the digest for the user data session (SXD) within the user data session and compared the generated digests DXD and SXD with the digest for the data transaction that was previously stored in the format DDNA, step 614. Finally, the user can also verify the non-repudiation of data from any time period, step 610, by generating the digest for the time period (TXD) based on the digests from data transactions (DXD) and the digests for the user data session (SXD) for the time period and compared the generated digest TXD with the previously stored TXD, step 616.

The digests generated for each data transaction is appended to each data transaction in form of DDNA. Below is a sample of the data stored in form of DDNA.

```
{
"ALRT" : 2,
"ARUL" : [ "All Access", "Data Change", "Large Records", "Privileged Users" ],
"BVAR" : "'A195113199','3503 0510 1080 8458'",
"CLNT" : "10.10.7.235",
"CMDS" : [ "INSERT" ],
"COID" : 5256908802235480736,
"COLS" : [ "ID", "CardNo" ],
"CONN" : [ 6, 1521, 23467, 168429451, 168429547 ],
"DATE" : "2011-09-07 03:27:22",
"DBNS" : "XE",
"DBUR" : "XDBA",
"ENVP" : [ 327683, 167772205, 1470698895, 1, 6, 3, 167772205, 1315366042 ],
"REQT" : [ 1521, 0, 0, 0, 0, 0 ],
"RESP" : [ 1521, 0, 0, 395, 1036, 0, 0, 0 ],
"RETS" : "O: 1 row(s)",
"RISK" : [ 19, 0 ],
"ROWS" : [ 1, 3 ],
"SCRC" : 3998041003890092272,
"SERV" : "10.10.7.139",
"SNSR" : "10.0.0.45",
"SSID" : 148348574378891787785,
"STMT" : "insert into TEST_DATA (ID, CardNo) values ('A195113199','3503 0510 1080 8458')",
"TABS" : {
"XE" : [ "TEST_DATA" ]
},
"TIME" : [ 395, 1036, 467462 ],
"DGST" : [ "Cert", "Datiphy-10.01.23.42", 1217721883791, 317143434221, 388109471, 13418741804 ]
}
``` where "DGST" includes user certificate method, method ID, DXD, and SXD;

"CMDS" is a query command;

"RESP" is a response.

Figure 7:
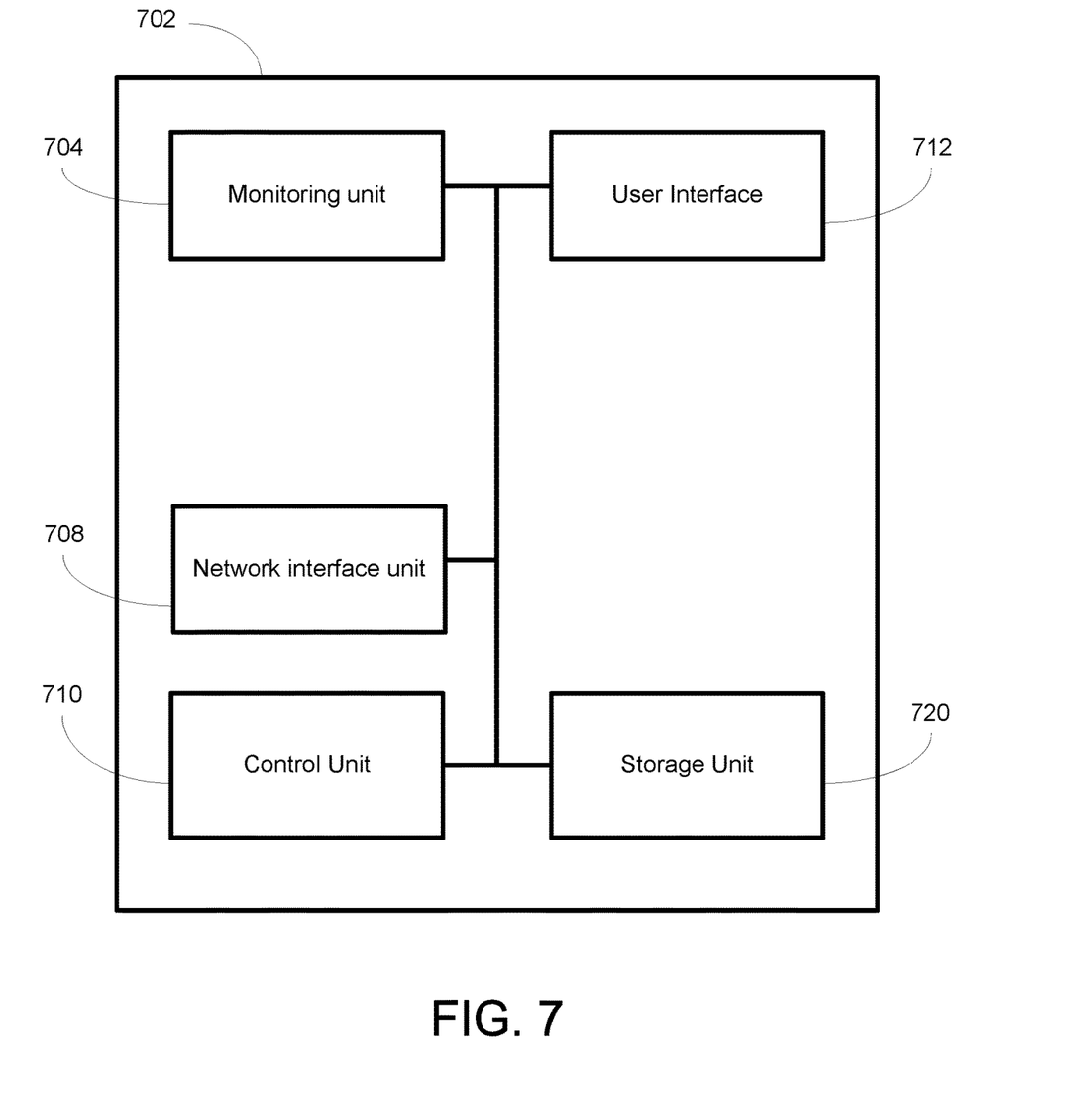
FIG. 7 illustrates an apparatus 702 according to one embodiment of the present invention.

FIG. 7 illustrates an apparatus 702 according to one embodiment of the present invention. The apparatus 702 connects to a network through a network interface unit 708 and monitors data transactions, through a monitoring unit 704, to and from one or multiple data servers connected to the network. When a data transaction is detected, the control unit 710 generates a digest for the data transaction. The storage unit 720 is a non-volatile computer-readable memory unit and may be internal or external to the apparatus 702. The storage unit 720 stores computer program instructions that, when executed by the control unit 710, enables the apparatus 702 to perform functions described in this specification. The control unit 710 will also generate digests for user sessions as well as a digest for each time period. The apparatus 702 has also a user interface unit 712 for supporting local user interface.

When in use, a system according to the present invention provides non-repudiation of the data collected, the system captures data from the transactions such as queries and responses. A data transaction comprises a query and a corresponding response. The data captured is hashed and the result of the hash is then encrypted. This encrypted data is a digest for the data transaction and is appended to the data structure for the captured data transaction. If this data transaction is the first transaction of a user session, the digest for this data transaction is labeled as a begin data transaction digest. The user session has ended, the digest for this data transaction is labeled as an end data transaction digest. The user session has a timer and within a user session there may be many data transactions. For each data transaction, a user session digest is generated by hashing and encrypting the data transaction digest and the digest from the previous user session. Besides creating the digests for data transactions and user sessions, the system of the present invention also generate a digest for a time period. The time period can be defined for any length and each time period may contain many data transactions. Each data transaction may extend beyond one single time period. The data transaction digests and the user session digests collected during a time period are hashed and encrypted to derive a time data transaction digest for the time period. By having digests for each data transactions, digests for user sessions, and digests for time periods, the non-repudiation of the data in the system can be provided.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated. The combinations of different features described in different embodiments in this specification are foreseeable and within the scope of the invention.

What is claimed is:

1. A method, for providing data non-repudiation for a plurality of concurrent user data sessions, each user data session having a plurality of data transactions occurring in a plurality of time periods, comprising:
    capturing data, into a captured data, from each data transaction;
    hashing the captured data into a hashed data;
    encrypting the hashed data into a digest;
    appending the digest to the captured data to form a data transaction digest;
    generating a user data session digest for each of the plurality of concurrent data transactions from the data transaction digest of a time period and the user data session digest of an immediate prior time period;
    hashing the data transaction digests and the user data session digests from the plurality of concurrent user data sessions within the time period into a hashed time data transaction data and encrypting the hashed time data transaction data into the time period digest; and
    recording the time period digest into a data file,
    wherein the time period digest provides non-repudiation for the data transactions within the time period.

2. The method of claim 1, further comprising:
    checking if there is a user data session by checking if there is a timer related to the user data session; and
    if there is no timer associated with the user data session, marking the data transaction digest as a begin data transaction digest and starting the timer for the user data session.

3. The method of claim 2, further comprising:
    checking if the user data session has ended or the timer for the user data session has expired; and
    if the user data session has ended or the first timer for the user data session has expired, marking the data transaction digest as an end data transaction digest.

4. The method of claim 1, wherein generating the user data session digest further comprises:
    encrypting the hashed user session data into the user session digest.

5. The method of claim 4, wherein, if the data transaction digest is a first data transaction digest for a user data session, the previous user data session digest is generated based on a session identifier and the data transaction digest.

6. A system, for providing data non-repudiation to a plurality of data transactions from a plurality of concurrent user data sessions within a time period, comprising:
    a monitoring unit connected to a network;
    a network interface unit in communication with the monitoring unit, the network interface monitors the plurality of data transactions on the network;
    a non-volatile computer-readable memory unit for storing computer program instructions; and
    a control unit,
    wherein the control unit, when executing computer program instructions, causes the system to
    capture data, into a captured data, from each data transaction,
    hash the captured data into a hashed data,
    encrypt the hashed data into a digest,
    append the digest to the captured data to form a data transaction digest,
    generate a user data session digest for each of the plurality of concurrent data transaction from the data transaction digest of a time period and the user data session digest of an immediate prior time period;
    hash the data transaction digests and user data session digests from the plurality of concurrent user data sessions within the time period into a hashed time data transaction data and encrypt the hashed time data transaction data into the time period digest; and
    record the time period digest into a data file,
    wherein the time period digest provides non-repudiation for the data transactions within the time period.

7. The system of claim 6, wherein the control unit, when executing computer program instructions, further causes the system to:
    check if there is a user data session by checking if there is a timer related to the user data session; and
    if there is no timer associated with the user data session, mark the data transaction digest as a begin data transaction digest and start the timer for the user data session.

8. The system of claim 7, wherein the control unit, when executing computer program instructions, further causes the system to
    check if the user data session has ended or the timer for the user data session has expired; and
    if the user data session has ended or the first timer for the user data session has expired, mark the data transaction digest as an end data transaction digest.

9. The system of claim 6, wherein generating the user data session digest further comprises:
    encrypting the hashed user session data into the user session digest.

10. The system of claim 9, wherein, if the data transaction digest is a first data transaction digest for a user data session, the previous user data session digest is generated based on a session identifier and the data transaction digest.

\* \* \* \* \*